United States Patent

Phipps et al.

[11] Patent Number: 6,080,439
[45] Date of Patent: Jun. 27, 2000

[54] METHOD OF COOKING AND FLAVORING MEAT

[76] Inventors: Ulyssess S. Phipps; John B. Martin, both of P.O. Box 77835; James N. Concannon, 2044 E. Seventeenth St., all of Tucson, Ariz. 85704

[21] Appl. No.: 09/365,217

[22] Filed: Jul. 30, 1999

Related U.S. Application Data

[60] Provisional application No. 60/094,626, Jul. 30, 1998.

[51] Int. Cl.⁷ .............................. A23B 4/044; A23L 1/01; A23L 1/31
[52] U.S. Cl. .............................. 426/523; 426/90; 426/92; 426/296; 426/315; 426/652; 426/420
[58] Field of Search .............................. 426/90, 92, 296, 426/289, 523, 652, 314, 315

[56] References Cited

U.S. PATENT DOCUMENTS

| | | | |
|---|---|---|---|
| 1,940,624 | 12/1933 | Feight | 426/652 |
| 2,104,619 | 1/1938 | Lehmann | 426/314 |
| 2,385,412 | 9/1945 | Hall | 426/652 |
| 2,423,964 | 7/1947 | Coffman | 426/315 |
| 2,582,174 | 1/1952 | Spencer | 426/296 |
| 3,454,377 | 7/1969 | Renwick | 426/314 |
| 3,492,134 | 1/1970 | Brummendorf | 426/314 |
| 3,615,729 | 10/1971 | Baker | 426/315 |
| 4,102,653 | 7/1978 | Simmons et al. | 426/314 |
| 4,190,677 | 2/1980 | Robins | 426/315 |
| 4,270,464 | 6/1981 | Kerres | 426/314 |
| 5,221,548 | 6/1993 | Walton | 426/523 |
| 5,427,805 | 6/1995 | Crace | 426/314 |

OTHER PUBLICATIONS

Food Manufacture, pp. 417–419, Oct. 1960.

*Primary Examiner*—Steven Weinstein
*Attorney, Agent, or Firm*—Mark E. Ogram P.C.

[57] ABSTRACT

Within the present invention, a powder or "fines" is created from the targeted wood (i.e. mesquite, peach, hickory, apple). This powder is then sprinkled onto, or rubbed into, the meat (fish, chicken, beet, ostrich, buffalo, etc.) and then the meat is flame grilled. During the flame grilling, the wood powder is incinerated, thereby releasing the wood's flavor into the meat through the smoke.

9 Claims, 1 Drawing Sheet

METHOD OF COOKING AND FLAVORING MEAT

Priority for this application is claimed from U.S. Provisional application Ser. No. 60/094,626, filed on Jul. 30, 1998, and entitled "Food Flavoring and Technique".

BACKGROUND OF THE INVENTION

This invention relates generally to foods and their preparation and more particularly to the flavoring of foods.

With the advancement of society, a great many advances have been made in the preparation and the seasoning of foods. For the preparation of meats though, there has also been a return to the flavoring which is obtained from cooking over real wood.

Many restaurants have instigated wood fired grills or rotisseries which help to implant the flavor of the wood into the meat By choosing the woods used (i.e. mesquite, cherrywood, walnut), the restaurant is able to offer the consumer a unique taste.

Unfortunately, these wood-fired grills and rotisseries, while very popular with the consumer, is not as popular with neighbors to the restaurant and with governmental agencies monitoring environmental concerns. There have been many movements to ban such wood-fired operations all-together.

Further, the restaurant is restricted to a single type of wood flavoring as it is totally impractical to have two grills operating so that the consumer can choose between mesquite and walnut. The consumer is restricted to a single choice.

It is clear that there is a need for a way to provide the "wood-fired" flavor while eliminating the problems noted above.

SUMMARY OF THE INVENTION

The present invention deals with the creation of a seasoning which is used to flavor meats, not through the absorption of the flavoring into the meat, but rather through the "burning" of the flavoring on the meat to impart flavor through the "smoke" from the burning flavoring.

Within the present invention, a powder or "fines" is created from the targeted wood (i.e. mesquite, peach, hickory, apple). This powder is then sprinkled onto, or rubbed into, the meat (fish, chicken, beet, ostrich, buffalo, etc.) and then the meat is flame grilled. During the flame grilling, the wood powder is incinerated, thereby releasing the wood's flavor into the meat through the smoke.

The flame grilling is preferably performed using natural gas or butane so that any environmental impact is reduced to a minimum. In some embodiments, an electric grill is used to release the wood flavoring into the meat and also to cook the meat.

In this context, "wood" refers to the traditional meaning, namely: the tough, fibrous cellular substance constituting the xylem of trees and shrubs, lying beneath the bark and consisting largely of cellulose and lignin.

The creation of the powder or fines from the wood is accomplished in a number of ways including the use of hammer-mills and grinders. Those of ordinary skill in the art readily recognize a variety of ways of accomplishing this task.

The invention, together with various embodiments of the invention will be more clearly illustrated by the accompanying drawings and the following description.

DRAWINGS IN BRIEF

DRAWINGS IN DETAIL

Figure 1:
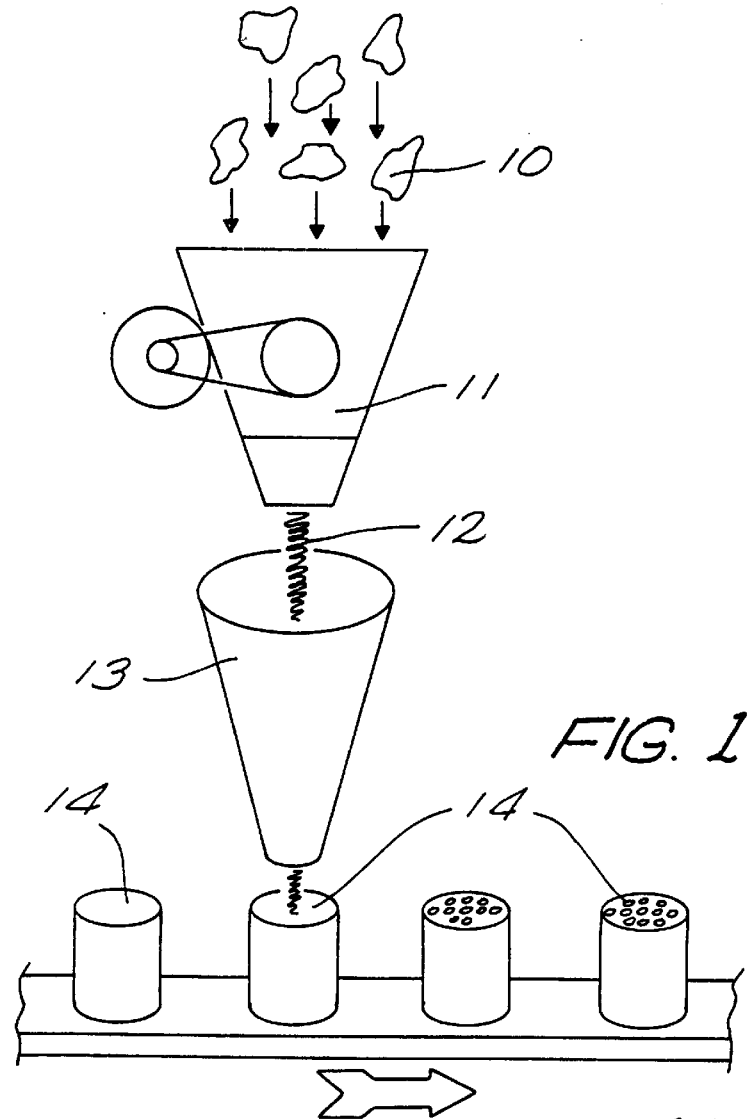
FIG. 1 illustrates the preparation of the powder or fines from the wood chips.

FIG. 1 illustrates the preparation of the powder or fines from the wood chips.

Wood chips 10 are chosen and deposited into grinder 11 which renders the wood chips into wood powder 12. Wood powder 12 is collected in hopper 13 for packaging into small shakers 14. The small shakers 14 have a screen or dispenser and cap placed on them prior to marketing.

As noted earlier, under this invention it is possible to package a variety of wood powders so that the restaurant or host is able to accommodate the preference of the customer/guest.

Note, in this invention, ideally the wood is rendered into a powder. Fines are also allowable in this context with sizes of less than one millimeter diameter being preferable.

Figure 2:
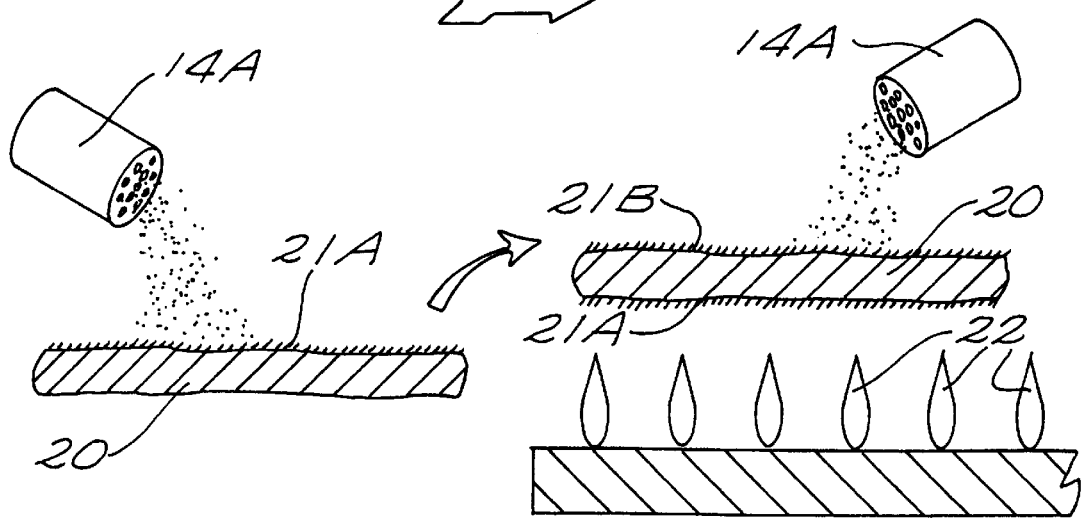
FIG. 2 illustrates the application of the invention.

FIG. 2 illustrates the application of the invention. Using cannister 14A, the cook applies the wood powder to a first side 21A of steak 20. Once a coating has been applied, steak 20 is flipped and placed upon a grill so that flames 22 are able to sear the steak and burn the wood powder on side 21A.

While side 21A is being cooked, the cook applies a coating of wood powder from cannister 14A on the opposing side 21B of steak 20.

Once side 21A is fully cooked, steak 20 is flipped and side 21B is cooked.

In this manner both sides of steak 20 are flavored without the use of a wood-fired grill.

While this figure uses flames 22 for the cooking and burning procedure, an electric grill also serves this function.

It is clear that the present invention creates a highly improved method for flavoring meat with a wood-fired flavor.

What is claimed is:

1. A method of cooking and flavoring meat comprising the steps of:
   a) applying a coating of wood powder to a first and second side of a piece of meat;
   b) exposing said first side of said meat to heat sufficient to burn said wood powder thereon so that the wood powder is incinerated and the wood's flavoring released into said meat; and,
   c) exposing said second side of said meat to heat sufficient to burn said wood powder thereon so that the wood powder is incinerated and the wood's flavoring released into said meat;
   said exposing steps being sufficient to cook said meat.

2. The method of cooking meat according to claim 1, further including the step of, prior to the step of applying a coating of wood powder, the step of grinding wood chips into a powder.

3. The method of cooking meat according to claim 2, further including the step of choosing said wood chips from a group consisting of:
   mesquite wood, peach wood, cherry wood, walnut, hickory wood, or apple wood.

4. The method of cooking meat according to claim 2, wherein the step of grinding wood chips into powder includes the step of packaging said powder into a shaker.

5. The method of cooking meat according to claim 2, wherein the wood powder has a diameter of less than one millimeter.

6. A method of cooking and flavoring meat comprising the steps of:
   a) selecting a piece of raw meat;
   b) applying a coating of wood powder to a first and second side of said piece of raw meat;
   c) exposing said first side of said raw meat to heat sufficient to burn said wood powder thereon so that the wood powder is incinerated and the wood's flavoring is released into said meat; and,
   d) exposing said second side of said meat to heat sufficient to burn said wood powder thereon so that the wood powder is incinerated and the wood's flavoring is released into said meat;
   said exposing steps being sufficient to cook said meat.

7. The cooking method according to claim 6, wherein said wood powder has a diameter of less than one millimeter.

8. The cooking method according to claim 7, further including the step of choosing said wood chips from a group consisting of: mesquite wood, peach wood, cherry wood, walnut, hickory wood, or apple wood.

9. The cooking method according to claim 7, wherein the step of grinding wood chips into powder includes the step of packaging said powder into a handheld shaker.

* * * * *